3,322,845
PROCESS FOR WORKING UP C₄-HYDROCARBON MIXTURE CONTAINING n-BUT-1-ENE

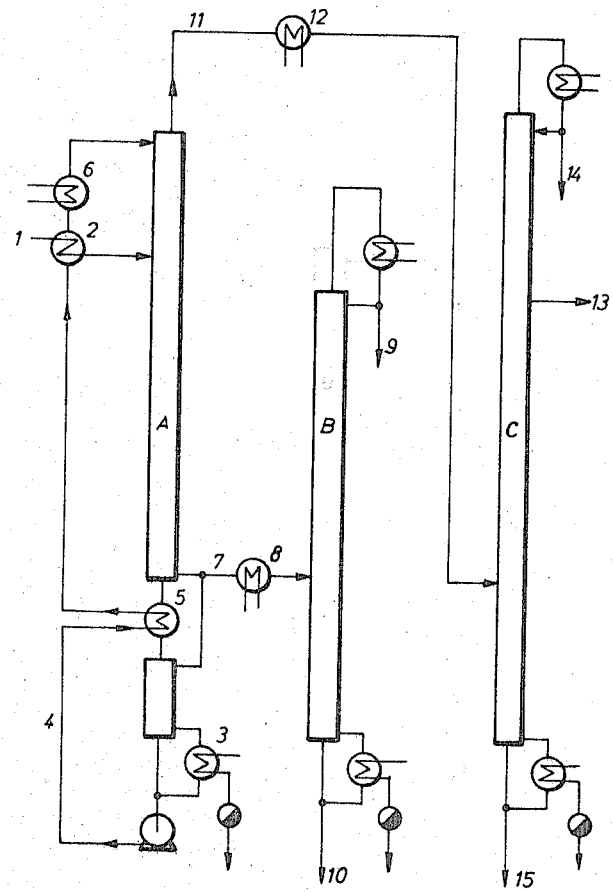
INVENTORS:
HANS-WALTHER BRANDT  BRUNO ENGELHARD

Hans-Walther Brandt, Cologne-Flittard, and Bruno Engelhard, Cologne-Stammheim, Germany, assignors to Farbenfabriken Bayer Aktiengesellschaft, Leverkusen, Germany, a corporation of Germany
Filed Dec. 1, 1964, Ser. No. 415,047
Claims priority, application Germany, Dec. 19, 1963, F 41,587
2 Claims. (Cl. 260—677)

The separation of n-but-1-ene from a mixture of butanes and butenes by fractional distillation can only be achieved at great expense on account of the small differences between the boiling points of the separate components. In particular, the separation between n-but-1-ene and i-butene cannot be carried out practically in this way.

It has been found that $C_4$-hydrocarbon mixtures containing n-but-1-ene can be worked up and that, in particular, n-but-1-ene can be separated from other butenes from a $C_4$-hydrocarbon mixture by selective absorption on aqueous silver nitrate solution and by working up, in the usual way, the hydrocarbon mixtures which are obtained.

It has been found that, of all the butenes, it is the solubility of n-but-1-ene from the $C_4$-hydrocarbon mixtures which is greatest in aqueous silver nitrate solution. The following table indicates the separation factors of $C_4$-hydrocarbons by comparison with n-but-1-ene in a 50% aqueous silver nitrate solution at 0° C. and 20° C., as they were found by us. Separation factors of $C_4$-hydrocarbons by comparison with n-but-1-ene at 1 atm. absolute.

|  | 0° C. | 20° C. |
|---|---|---|
| Butane | 5.710 | 11.500 |
| Trans-but-2-ene | 2.970 | 3.410 |
| Iso-butene | 1.910 | 1.960 |
| Cis-but-2-ene | 1.137 | 1.138 |
| n-But-1-ene | 1.000 | 1.000 |

Based on these separation factors, it is possible to develop a separation process in which, by an extractive distillation with aqueous silver nitrate solution, all the n-but-1-ene and some of the cis-but-2-ene are separated from a butane/butene mixture. Two gas mixtures are then obtained, one containing n-but-1-ene and cis-but-2-ene, which can be separated by a normal distillation easily into the two pure substances. The other no longer contains any n-but-1-ene, so that but-1-ene can be separated therefrom by normal distillation.

The solubility of the butenes in an aqueous silver nitrate solution depends on the silver concentration, the temperature and the pressure. The higher the silver concentration, the greater is the solubility, the limit being given by the saturation concentration of the silver salt solution. In addition, the solubility of the butenes increases with falling temperature. Thus, it was found that a 50% silver nitrate solution at +4° C. takes up 74 liters of n-but-1-ene per liter of solution. It is therefore advantageous to use the lowest possible temperatures, e.g. temperatures in the region of −5 to +25° C. at normal pressure. It is desirable, as regards the process, so to select pressure and temperature that the $C_4$ gases can still be condensed with cooling water.

The process according to the invention can for example be carried out in the manner indicated below, the process being simultaneously explained by reference to the figure. Column A has 73 plates and operates at a head pressure of 4 atm. abs. The butane/butene mixture arrives in liquid form by way of the pipe 1, is evaporated in 2 and supplied to the 60th plate in the column A. A 50% aqueous silver nitrate solution is brought to boiling point in the evaporator 3 and pumped back through the pipe 4 to the head of the column. This stream thus heats the return from the column in the exchanger 5, evaporates the supply into 2 and is cooled to 37° C. in the condenser 6. A gas mixture consisting of n-but-1-ene and cis-but-2-ene is drawn off 5 plates above the bottom through a pipe 7 and is condensed in 8. This mixture is separated in the column B which operates with a head pressure of 6 atm. abs. and has 100 plates. 99% n-but-1-ene is drawn off through the pipe 9 and 98% cis-but-2-ene is drawn off through the pipe 10. From the head of the column A, a gas mixture is drawn off through the pipe 11, the said mixture containing no n-but-1-ene and only small quantities of cis-but-2-ene. It is condensed in the condenser 12 and supplied to the column C, which operates at 6 atm. abs. and has 160 plates. With this column, 99% i-butene is recovered as a side-stream, while a mixture of 30% iso-butane and 70% iso-butene forms at the head 14 and a mixture of 8% iso-butene, 27% n-butane, 46% trans-but-2-ene and 19% cis-but-2-ene is drawn off at the bottom 15.

Example 1

Using a laboratory column with a diameter of 50 mm. and having 128 bubble plates, and operating at normal pressure, 200 liters per hour of the gas mixture with 25% butane, 1.5% iso-butene, 18% n-but-1-ene, 34.5% trans-but-2-ene and 21% cis-but-2-ene is supplied a few plates below the head. 3 liters per hour of a 50% silver nitrate solution with a temperature of −2° C. are run in at the head of the column. This solvent stream is heated on the uppermost plates by the heat of condensation of the hydrocarbons to +20° C. At the bottom of the column the silver nitrate solution is heated to 106° C., in order to drive off the butenes and thereafter, after cooling to −2° C., it is pumped again to the head of the column, 10 plates above the bottom, 20 liters per hour of gas are drawn off from the column, the said gas consisting of 81% of n-but-1-ene and 19% of cis-but-2-ene. The other components are only to be found in traces. The gas discharging at the head of the column still contains 11.5% of n-but-1-ene. The side-stream is thereafter introduced into a distillation column with 120 plates, in which a separation into 99% n-but-1-ene and 98% cis-but-2-ene is carried out.

Example 2

100 liters per hour of a gas mixture with the concentration as indicated above are introduced into the experimental column described in Example 1. With the same quantity of solvent and temperature, 10 liters per hour of a gas mixture are drawn off at the 10th plate, the mixture consisting of 99% of n-but-1-ene and 1% of cis-but-2-ene.

Example 3

A laboratory column with 80 plates and a diameter of 50 mm., which operates at a head pressure of 4 atm. abs. is supplied at the 60th plate with 70 liters per hour of a $C_4$ gas mixture, which has the following composition:

| | Percent |
|---|---|
| Butane | 8.1 |
| Iso-butene | 47.5 |
| n-But-1-ene | 25.9 |
| Butadiene | 0.1 |
| Trans-but-2-ene | 11.0 |
| Cis-but-2-ene | 7.4 |

14 liters per hour of a 60% silver nitrate solution are supplied at 37° C. to the head of the column. At the bottom of the column, this solution is heated to 145° C. in order to drive off the dissolved butenes. At the 5th plate above the bottom, 24 liters per hour of the gas are drawn off, this gas consisting of 88.4% of n-but-1-ene 0.2% of butadiene and 11.4% of cis-but-2-ene. This mixture is thereafter separated in a distillation column with 100 plates into n-but-1-ene and cis-but-2-ene.

At the head of the silver nitrate column, 46 liters per hour of a gas are drawn off, the said gas containing neither n-but-1-ene nor butadiene. This gas is likewise supplied to a distillation column with 160 plates, a 99% i-butene being obtained as side-stream at the 100th plate.

*Example 4*

Into a laboratory column with 80 plates and a diameter of 50 mm., operating at a head pressure of 4 atm. abs., there can introduced 70 liters per hour of a $C_4$ gas mixture, which has the following composition:

| | Percent |
|---|---|
| Butane | 8.1 |
| Iso-butene | 47.5 |
| n-But-1-ene | 25.9 |
| Butadiene | 0.1 |
| Trans-but-2-ene | 11.0 |
| Cis-but-2-ene | 7.4 |

At the head of the column, 14 liters per hour of a 50% silver nitrate solution are introduced at 37° C. At the bottom of the column, this solution is heated to 145° C. in order to drive off, the dissolved butenes. A few plates above the bottom, 24 liters per hour of gas are driven off, this gas containing of n-but-1-ene, butadiene and cis-but-2-ene. This mixture is thereafter separated in a normal distillation column into n-but-1-ene and cis-but-2-ene.

At the head of the silver nitrate column, 46 liters per hour of a gas are drawn off, this gas containing neither n-but-1-ene nor butadiene. This gas is likewise supplied to a normal distillation column, in which pure iso-butane is distilled off.

We claim:
1. Process for the separation of n-but-1-ene from $C_4$ hydrocarbon mixtures containing both n-but-1-ene and iso-butene, which comprises contacting such a $C_4$-hydrocarbon mixture with an aqueous silver nitrate solution having a concentration of from 50–60% at a temperature of from −5 to 25° C., whereby the n-but-1-ene is separated by selective absorption into the aqueous silver nitrate solution.
2. Process according to claim 1, wherein cis-but-2-ene is separated out with n-but-1-ene by selective absorption into said aqueous silver nitrate solution and is separated therefrom by fractional distillation.

References Cited

UNITED STATES PATENTS

| | | | |
|---|---|---|---|
| 2,391,404 | 12/1945 | Friedman et al. | 260—677 |
| 2,458,067 | 1/1949 | Friedman et al. | 260—677 |
| 2,498,204 | 2/1950 | Francis | 260—677 |
| 2,515,140 | 7/1950 | Straud | 260—677 |

OTHER REFERENCES

J.A.C.S. 73 (1951), p. 3711, col. 2 last paragraph, copy P.O.L., Chemie und Technologic du Monoolefin, 1957, p. 223, Table 182.

ALPHONSO D. SULLIVAN, *Primary Examiner.*